Aug. 21, 1923.
J. GEIER
1,465,260
STOP SIGNAL DEVICE
Filed March 9, 1922
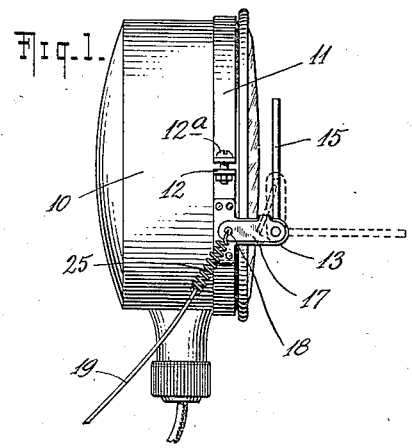
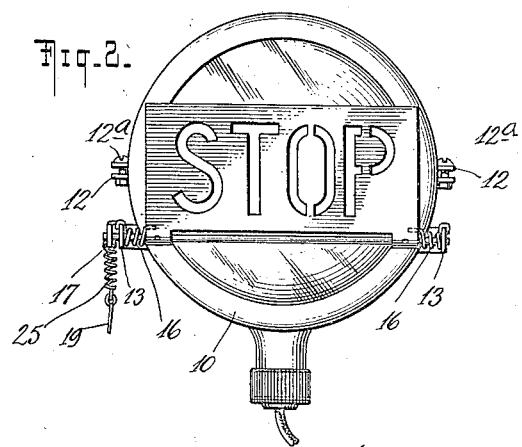
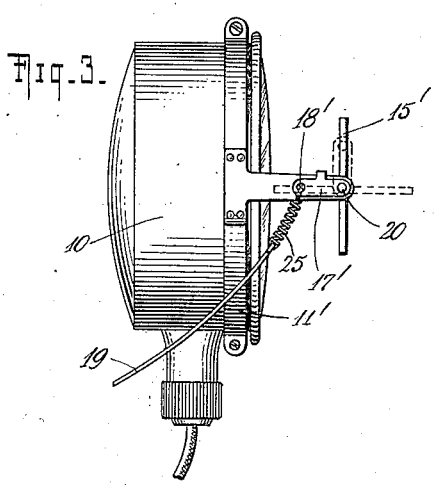
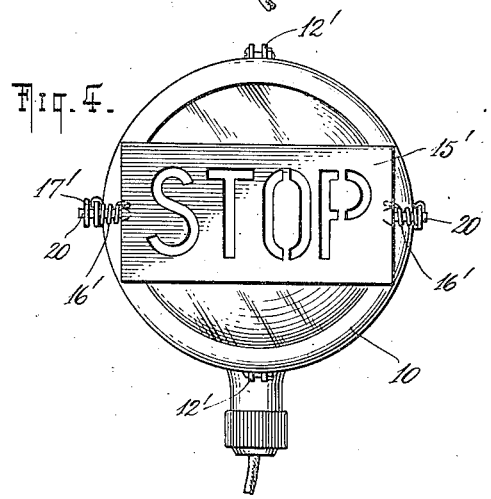
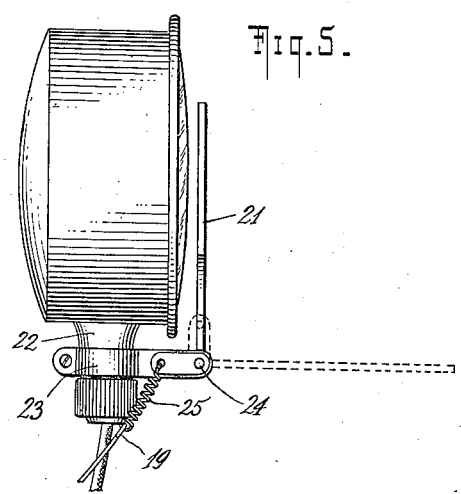
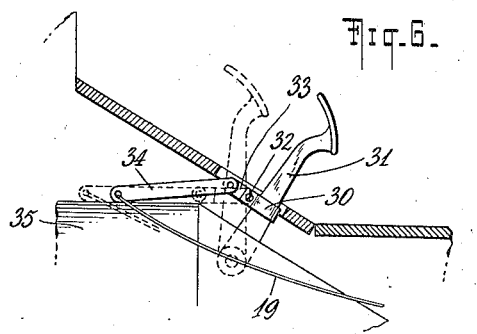
INVENTOR
James Geier
BY
Richards Geier
ATTORNEYS.

Patented Aug. 21, 1923.

1,465,260

UNITED STATES PATENT OFFICE.

JAMES GEIER, OF TROY, NEW YORK.

STOP SIGNAL DEVICE.

Application filed March 9, 1922. Serial No. 542,294.

*To all whom it may concern:*

Be it known that I, JAMES GEIER, a citizen of the United States, and resident of Troy, in the county of Rensselaer and State of New York, have invented certain new and useful Improvements in Stop Signal Devices, of which the following is a specification.

All the prior art stop signal devices adapted to be used in connection with the tail lamp of an automobile or other vehicle as far as I am aware are constructed as a constituent part of the lamp structure thereby making it necessary to discard altogether or entirely rebuild the ordinary tail lamp if it is desired to equip the car with a stop signal lamp.

The principal object of this invention therefore is to provide a stop signal in the form of an attachment adapted to be quickly and readily secured to the tail lamp without necessitating any changes to the lamp structure and obviating the necessity of discarding the lamp and the purchase of an entire new lamp structure.

Another object is to devise a signal which can be readily operated from the chauffeur's seat and A further object is to devise an attachment for utilizing the movement of the brake pedal for operating the signal.

For the accomplishment of these and such further objects as will hereinafter be apparent to those skilled in the art to which this appertains, the invention consists in the construction, combination and arrangement of parts herein specifically described and illustrated in the accompanying drawings, wherein is shown a preferred embodiment of the invention, but it is to be understood that changes, variations and modifications may be resorted to which fall within the scope of the claims hereunto appended.

In the drawings forming a portion of this specification.

Fig. 1 is a side view showing a lamp to which a form of my signal device has been attached.

Fig. 2 is a front view of the lamp and attachment shown in Fig. 1.

Fig. 3 is a view similar to Fig. 1 showing a different modification of my invention.

Fig. 4 is a front view of the modification shown in Fig. 3.

Fig. 5 is a side view of a lamp showing another modification, and

Fig. 6 shows a sectional view through a portion of an automobile showing a form of an attachment for utilizing the motion of the brake pedal to operate the signal.

As shown in the drawings, the numeral 10 indicates a tail lamp to which is attached a clamping member 11 preferably constructed of two semi-circular rings having outwardly turned flanges 12 suitably drilled to receive the bolts 12ª or other suitable fastening devices, by means of which the clamping member may be rigidly secured to the lamp casing.

At any desirable points on the clamping member a pair of oppositely arranged laterally projecting ears 13 are located which ears are provided with aligned holes in which is pivoted a pivot rod 14, having the signal 15 suitably secured thereto. Any suitable means may be used to hold the signal normally at a right angle, to the lamp in its inoperative position and as shown may consist of a spring 16 coiled around each end of the rod 14 adjacent the ears 13, one end of each spring being secured to the adjacent ear 13 and the other end being secured to the signal 15. The outer extremity of one end of the rod 14 has secured thereto one end of an operating arm 17, the other end of which is provided with an aperture 18 adapted to receive one end of an operating wire or cord 19 by means of which the signal is actuated.

It will be noted that in the modification shown in Figs. 1 and 2, the lower end of the signal member is secured to the pivot rod, while in the modification shown in Figs. 3 and 4, the signal is pivoted substantially at its centre.

As shown in Figs. 3 and 4, the lamp 10 is provided with a clamping member 11' composed of semicircular sections provided with the flanges 12' which are clamped together about the lamp by bolts 12ª in the same manner as in the form shown in Figs. 1 and 2 except that the flanges are preferably located at the top and bottom of the lamp to allow for the proper location of the projecting ears 13' which are apertured to receive the stub shafts 20, suitably secured to and projecting laterally from the sides of the signal 15'. A coil spring 16' is twined around each of the stub shafts 20, the ends of the springs being secured to the signal and the adjacent ear 13' to normally hold the signal in its inoperative or horizontal position. The operating arm 17' similar to the arm 17 has secured to its end aperture 18' an actuating wire 19.

In the modification shown in Fig. 5, the signal 21 is secured to the lamp socket 22 by means of a split clamp 23 to the outer projecting end of which is pivoted the signal by means of the pivot rod 24. One end of the pivot rod has secured thereto an operating arm 25 provided with the aperture 26 adapted to be engaged by the wire 19.

It will, of course, be understood that a suitable spring device such as shown in connection with the modifications heretofore described will be provided in the modification shown in Fig. 5, to normally hold the signal in its horizontal or inoperative position.

It will be further understood that the modification shown in Figs. 3 and 4 could also be constructed with the signal member pivoted upon a vertical axis as well as upon a horizontal axis, the letters being cut out so as to read in a vertical instead of a horizontal row.

Fig. 6 illustrates an attachment by means of which the movement of the brake pedal in applying the brakes is used to actuate the signal. As shown a split clamp 30 is clamped upon the brake pedal lever 31, by means of the bolt 32 or other suitable securing means. An ear 33 projects forwardly and upwardly from the clamp and has pivoted to its outer end an operating link 34, the outer free end of which is adapted to rest upon the transmission housing 35 or any other conveniently located part of the automobile. The forward end of the wire 19 is secured to an aperture 36 adjacent the free end of link 34.

It will of course be understood that any suitable or desirable inscription or symbol can be cut out of the signal and that the wire could be operated by bringing one end to any conveniently located point to enable it to be pulled by hand instead of by the operation of the brake pedal.

The operation of the device is as follows, the signal being normally held in inoperative position at a right angle to the lens of the lamp by the spring is turned to its operative position by the connecting wire 19 when the brake pedal is pushed forward to apply the brakes and stop the car, or if the brake attachment is not used the signal may be operated by hand, in an obvious manner. When the brake or wire is released, the springs will return the signal to its inoperative position.

It will be noted that by means of the arrangement of the parts 32 and 34 shown in Fig. 6 that the movement of the brake pedal is amplified so as to produce the amount of motion necessary to actuate the signal and obviously the proportions of these members and the angles thereof can be varied as described in order to obtain the necessary amount of motion.

A coiled spring 35 or other suitable resilient member is preferably inserted in the connection 19 between the operating means and the signal in order to take up slack in the connection and keep the same always in a taut condition.

Having thus disclosed my invention, what I claim as new and desire to secure by Letters Patent of the United States, is:

1. The combination with an automobile signal attachment, of means to actuate said signal, comprising a pair of pivotally connected members connected to the brake operating mechanism of the automobile and means to connect said members to the signal, said members adapted to be moved from relatively inclined positions into substantial alignment with each other upon depression of the brake pedal, whereby the movement of the brake pedal will transmit a greater movement to the connecting means.

2. The combination with an automobile signal attachment, of means to actuate said signal, comprising a member adapted to be connected to the brake operating mechanism of the automobile, a link pivotally connected at one end to said member, the other end of said link being free and adapted to rest upon a fixed support in an angular position with respect to said member when the brake is released, said link and member moving into substantial alignment when the brake is applied and means to connect the free end of said link to said signal.

3. The combination with an automobile signal attachment, of means to actuate said signal comprising a member, adapted to be connected to the brake pedal of the automobile, having an arm extending upwardly therefrom, a link pivotally connected to one end of said arm, the other end of said link being free and adapted to rest upon a fixed support in an angular position with respect to said member when the brake is released, said link and member being moved into substantial alignment when the brake lever is depressed, thereby producing an amplified movement of the free end of said link, and means to connect the free end of said link with said signal to actuate said signal to an operative position.

Signed at Troy in the county of Rensselaer and State of New York, this 18 day of February A. D. 1922.

JAMES GEIER.